United States Patent [19]

Spencer et al.

[11] Patent Number: 5,388,881
[45] Date of Patent: Feb. 14, 1995

[54] PORTABLE GOLF CART COVER AND METHOD OF MANUFACTURE THEREFOR

[75] Inventors: Wayne R. Spencer, Newport News; Bernard C. Smith; William M. Smith, both of Poquoson, all of Va.

[73] Assignee: Wayne R. Spencer, Newport News, Va.

[21] Appl. No.: 28,129

[22] Filed: Mar. 9, 1993

[51] Int. Cl.⁶ .................................................. B60J 9/00
[52] U.S. Cl. ....................................... 296/77.1; 296/79
[58] Field of Search ................... 296/77.1, 79, 102; 280/DIG. 5; 24/68 CD, 459, 462, 522

[56] References Cited

U.S. PATENT DOCUMENTS

| | | | |
|---|---|---|---|
| 916,439 | 3/1909 | Grover | 296/77.1 |
| 2,608,198 | 8/1952 | Goodman | 135/104 |
| 2,639,751 | 5/1953 | Flaherty | 150/166 |
| 3,709,553 | 1/1973 | Churchill et al. | 296/190 |
| 3,829,152 | 8/1974 | Hobbs | 296/77.1 |
| 3,834,756 | 9/1974 | Grell | 296/136 |
| 3,908,777 | 9/1975 | Davidson | 180/69.21 |
| 4,013,315 | 3/1977 | West | 296/83 |
| 4,014,589 | 3/1977 | Yerkey | 296/77.1 |
| 4,037,614 | 7/1977 | Hines et al. | 296/102 |
| 4,098,536 | 7/1978 | Mills | 296/77.1 |
| 4,336,964 | 6/1982 | Pivar | 296/77.1 |
| 4,621,859 | 11/1986 | Spicher | 296/77.1 |
| 4,773,694 | 9/1988 | Gerber | 296/77.1 |
| 4,795,205 | 1/1989 | Gerber | 296/77.1 |
| 4,819,979 | 4/1989 | Moglia | 296/77.1 |
| 4,830,037 | 5/1989 | Held | 135/88 |
| 5,069,481 | 12/1991 | Strange | 280/769 |
| 5,146,967 | 9/1992 | Chapman | 150/159 |
| 5,310,235 | 5/1994 | Seymour et al. | 296/77.1 |

FOREIGN PATENT DOCUMENTS 1810129  7/1979  Germany ............................. 24/459

OTHER PUBLICATIONS

Scotch ® Brand Adhesive Transfer Tapes Brochure, from 3M, Jan. 1990.

*Primary Examiner*—David M. Mitchell
*Assistant Examiner*—Andrew C. Pike
*Attorney, Agent, or Firm*—Larson and Taylor

[57] ABSTRACT

A portable golf cart cover which is made of a lightweight flexible material may be folded to a compact size for storage in a golf club bag. The cover is easily attached to and removed from any golf cart of the type having a roof. The cover requires a minimal number of attachment means, thereby enabling easy access to the cabin and golf club compartment. The cover may be manufactured by joining three sections using an adhesive or by heat sealing.

31 Claims, 5 Drawing Sheets

PORTABLE GOLF CART COVER AND METHOD OF MANUFACTURE THEREFOR

FIELD OF THE INVENTION

The present invention is directed to a golf cart cover and, more particularly, to a lightweight, portable golf cart cover.

BACKGROUND OF THE INVENTION

Golf has become a year-round sport which is played in numerous countries throughout the world. Because of the popularity of the sport, it is often necessary to reserve course time at least several days in advance. Moreover, as in any sport, the players generally prefer to set aside a particular time during the week, or even during the month, for the activity. Thus, it is often the case that golfers will play in less than ideal weather conditions rather than reschedule their game.

During inclement weather, the roof of a golf cart will provide some protective cover for golfers seated in the cabin section. On a rainy day, however, it is also preferable to use a golf cart cover to shield the cabin section from rain blowing through the open sides, front and back of the cart and also to protect any golfing equipment placed in the back of the cart. Various types of portable golf cart covers are commercially available. These covers are typically comprised of several panels of a water-repellant material such as canvas or tarpaulin. A window, made of a transparent plastic material, is provided in at least the front panel for purposes of visibility. The panels may be joined to one another and to the windows by sewing or with heavy-duty zippers. These covers are usually attached to the cart by means of hooks and/or clips. Access into and out of the cart is afforded by an opening in at least one of the side walls. Typically, the opening is held closed by means of a heavy-duty zipper or snaps.

Although most of these golf cart covers provide adequate protection from the rain, they have numerous drawbacks. For example, canvas and tarpaulin are relatively heavyweight materials, having a thickness on the order of at least 12 mils, which prohibits folding a cover constructed of this material to a size which is compact and easy to transport and store. Moreover, folding the cover up and onto the roof when not in use tends to given an unsightly appearance. Because the material is heavyweight, panels must be joined by sewing them together or by sewing in zippers, all of which leads to high manufacturing costs. The stitching may eventually weaken and tear, and zippers often stick or even break. In addition to being bulky, a canvas or tarpaulin cover weighs an average of 12-15 pounds and can be quite costly to purchase. Canvas or tarpaulin also has a tendency to become discolored from soiling and moldy if not allowed to dry completely before folding.

Yet another disadvantage of the prior art golf cart covers is that the means for attachment of the cover to the cart can be cumbersome. Typically, the covers are secured by attaching hooks or clips, located along the bottom edges of the cover and permanently affixed thereto, to the underside of the cart. When the cover is attached to the underside of the cart, access to the passenger compartment is awkward and somewhat limited. Moreover, many of the new unibody golf cart constructions do not have a protruding edge or structure on the underside to enable attachment of all hooks or clips.

Others have previously attempted to overcome one or more of these drawbacks. U.S. Pat. No. 4,098,536 to Mills, for example, discloses a weathershield for golf carts which, when not in use, may be folded and packed into a pouch for storage. The shield may be constructed of a transparent plastic material. However, the use of a heavy-duty zipper in at least one side wall necessitates the use of a relatively heavyweight material. The shield must be secured at intervals around the outside body of the cart by clamps, hooks, and/or snaps.

U.S. Pat. No. 4,013,315 to West discloses a rain curtain assembly for a golf cart comprised of a plurality of panels which are compressible into a small package when not in use. However, assembly of the curtain tends to be somewhat complex, requiring tie cords for securing the panels and suction cups and hook means to attach the curtain to the golf cart. Moreover, cloth binding must be sewn onto the panels to provide strength and shape.

Accordingly, the need exists to provide an improved, cost effective, portable golf cart cover made of a lightweight, yet durable, material, the cover being easily mounted on and attached to any golf cart having a roof and foldable to a compact size when not in use.

SUMMARY OF THE INVENTION

Thus, it is a purpose of the present invention to overcome the disadvantages of the prior art and thereby provide a relatively inexpensive, lightweight, portable golf cart cover.

In accordance with a preferred embodiment of the invention there is provided a portable cover for a golf cart comprising: a roof panel, opposed side panels, a front panel, and a back panel, all panels being of a lightweight material sufficiently light and flexible to enable the cover to be folded to a compact size and shape when not in use, the weight of the cover being no more than 8 pounds. Preferably the cover may be folded to dimensions of $10 \times 12 \times 2.5$ inches and has a total weight of no more than 4 pounds.

Preferably, the panels are joined together using adhesives or heat sealing, in the absence of stitching, zippers, or other material intrusive means. Also, access to the interior of the cart is preferably provided solely by a separation between each of the side panels and the back panel. A preferred attachment means enables the attachment of the cover to fender wells, handles on the golf cart, and to a suitable structure at the rear of the cart using, for example, a clip which is moveable to various positions on the cover, the clip being joined to a hook by a flexible strip of material.

According to a preferred method of manufacturing the portable golf cart cover, three sections of a flexible transparent material having a thickness ranging from 2 to 12 mils, most preferably 6 mils, are joined by means of an adhesive such as a double-sided tape or by heat sealing.

It is therefore an object of the present invention to provide a portable golf cart cover which is cost-effective and made of a lightweight material which can be stored compactly and installed on all carts provided with roofs and which is also transparent to enable optimum visibility.

It is another object of the present invention to provide a portable golf cart cover requiring a minimum number of attachment means, thereby enabling easy access to the cabin and golf club compartment. In addition, because of few attachments required, the time to secure cover to cart is less than required for existing covers.

It is a further object of the present invention to provide a method of making a golf cart cover using adhesives or heat sealing, thereby avoiding the problems associated with stitching, zippers or other material intrusive means.

These and other objects of the present invention will become apparent from the detailed description to follow.

BRIEF DESCRIPTION OF THE DRAWINGS

There follows a detailed description of the preferred embodiments of the present invention which are to be taken together with the accompanying drawings, wherein.

DETAILED DESCRIPTION OF THE PREFERRED EMBODIMENTS

Referring now to the figures, like elements are represented by like numerals throughout the several views.

Figure 1:
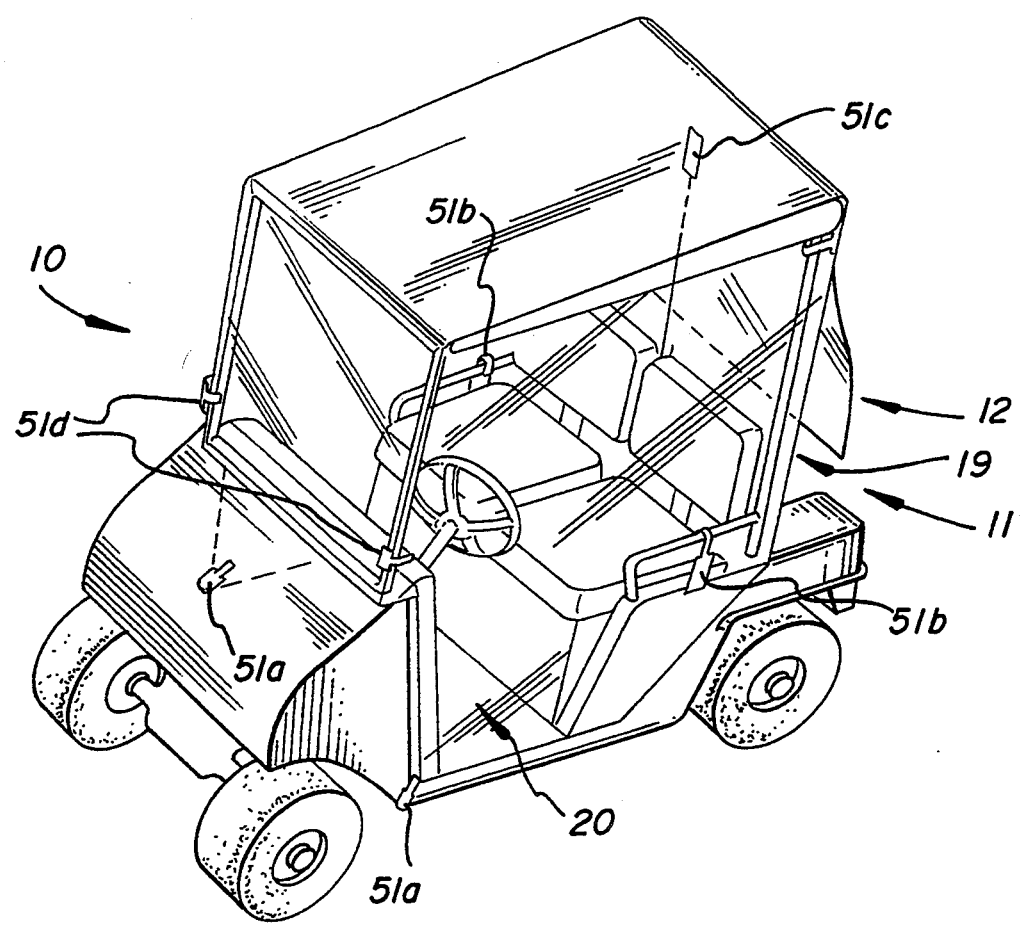
FIG. 1 is a perspective view of a golf cart having a portable golf cart cover in accordance with the present invention mounted thereon.

Referring to FIG. 1, a golf cart with a portable cover thereon is represented generally at 10. The golf cart itself is designated by the numeral 11 and the portable cover by the numeral 12. The cover 12 is sized to completely enclose both the cabin 20 and golf club compartment 19, thereby providing a weathershield for both passengers and golfing equipment. The cover 12 may be attached to the cart 11 by any suitable means, such as by placing grommets at various positions in the cover 12 and then attaching hooks at appropriate locations along the cart 11 as needed. However, the cover 12 is most preferably held in place by attachment means 51a-d which will be discussed in further detail in conjunction with FIGS. 6-8 below.

Figure 2:
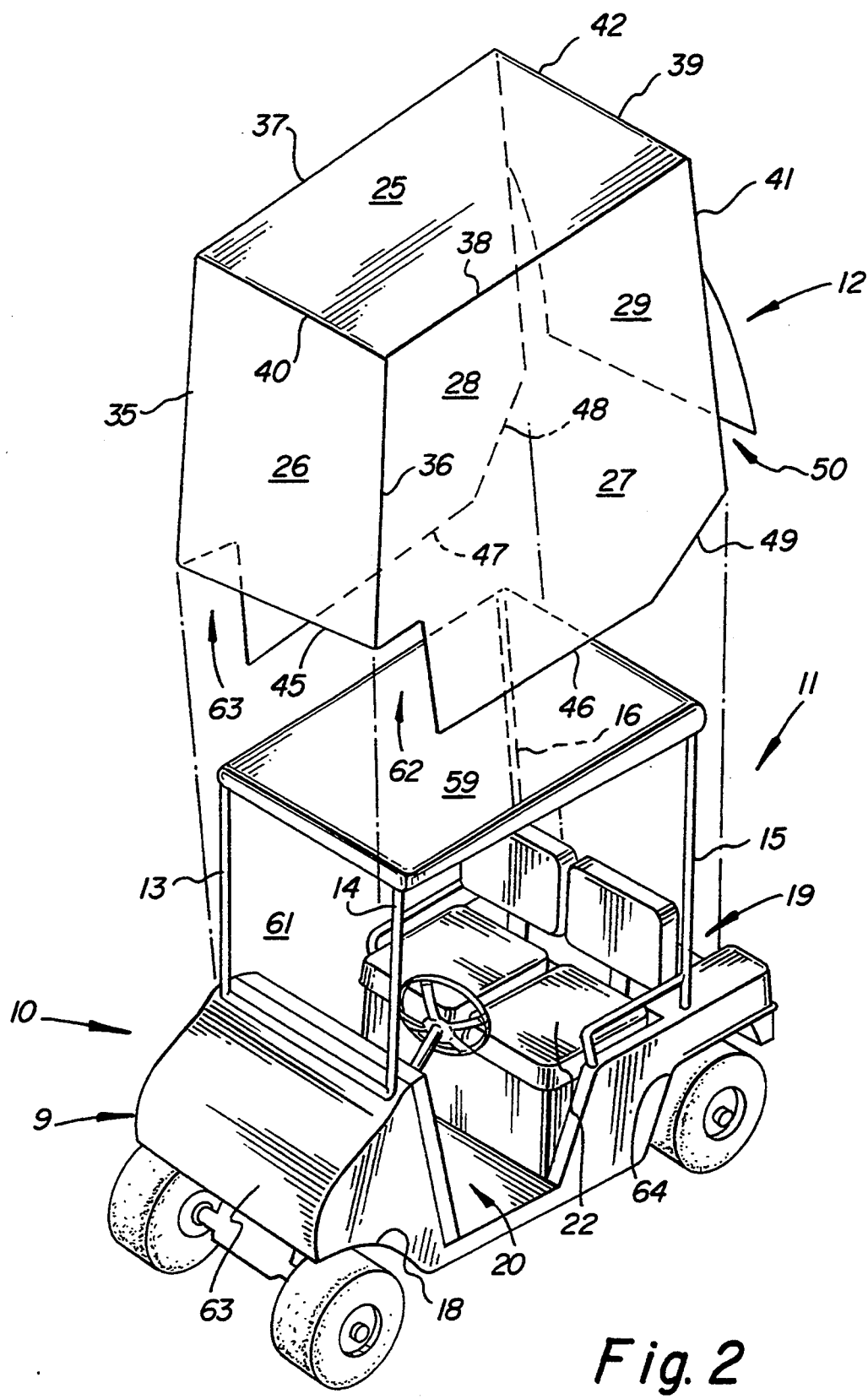
FIG. 2 is a perspective view of a golf cart similar to FIG. 1 but showing the golf cart cover raised above the cart for purposes of illustration.

Referring also to FIG. 2, which shows the golf cart cover 12 raised above the golf cart for purposes of illustration, the cover 12 is comprised of a roof panel 25, opposed side panels 27, 28, a front panel 26 and a back panel 29. The roof panel 25 lies on top of the roof 59 of the golf cart 11 which typically extends over the entire cabin 20 and is mounted on the base 9 of the cart 11 by supporting posts 13, 14 at the front of the cart 11 and by supporting posts 15, 16 at the back of the cart 11. When the cover 12 is mounted on the cart 11, access to the cabin 20 and golf club compartment 19 is provided solely by a separation 50 between the back panel 29 and each of the side panels 27, 28.

The front panel 26 is permanently joined to the roof panel 25 at meeting edges 40 and to the side panels 27, 28 at meeting edges 36, 35, respectively. The front panel 26 is sized to cover the front window 61 of the cart 11.

If the front window 61 is equipped with a windshield made of an acrylic such as Plexiglas ® or other suitable material, no front panel attachment is necessary. However, if the front window 61 is open, the front panel 26 should be attached to the cart 11, and is most preferably attached to the supporting posts 13, 14 by attachment means 51d. This attachment is necessary in order to keep the front panel 26 taut.

Figure 3:
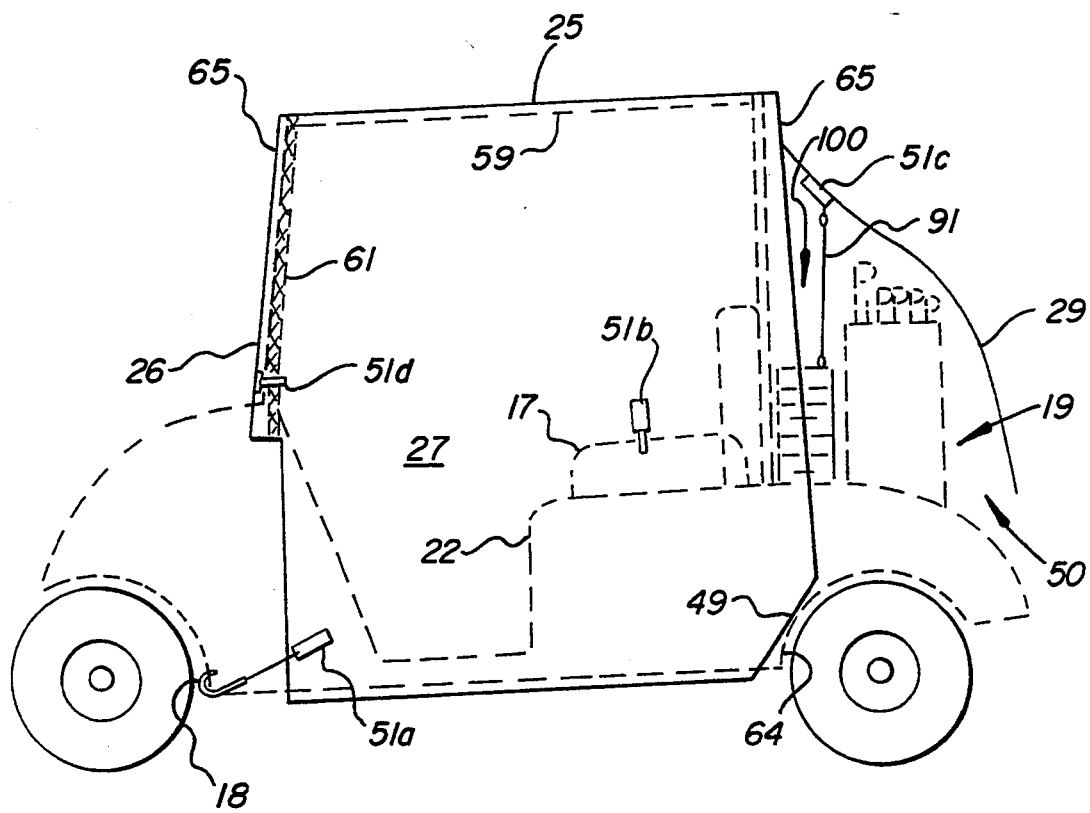
FIG. 3 is a side view of the golf cart and cover, with the golf cart shown in dashed lines and the cover shown in solid lines.

The opposed side panels 27, 28 are permanently joined to the roof panel 25 at meeting edges 38, 37, respectively. As best shown in FIG. 3, the side panels 27, 28 are preferably attached to the base 9 of the cart 11 by attachment means 51a which join the front corners 62, 63 to the front fender wells 18 and by attachment means 51b which join the back corners 48, 49 to handles 17 adjacent the seats 22. Alternatively, the back corners 48, 49 may be attached to the back fender wells 64. Because the attachment means 51a or 51b attach to the fender wells 18, 64 or the handles 17, respectively, the golf cart cover 12 does not require a rim or other structure at the base of the cart 11 to secure the attachment means.

The back panel 29 is permanently joined to the roof panel 25 at meeting edges 39. The back panel 29 may be partially joined to the side panels 27, 28 at meeting edges 41, 42, respectively. However, the separation 50 must be provided in order to enable the side panels 27, 28 to be lifted to gain access to the cabin 20. The separation 50 between the back panel 29 and side panels 27, 28 also allows the back panel 29 to be lifted to gain access to the golf club compartment 19. Attachment of the back panel 29 to a structure, such the golf bag holding means or the cart basket 100 as shown in FIG. 3, using an attachment means 51c is necessary to secure the cover 12 on the cart 11 at the rear.

Figure 5:
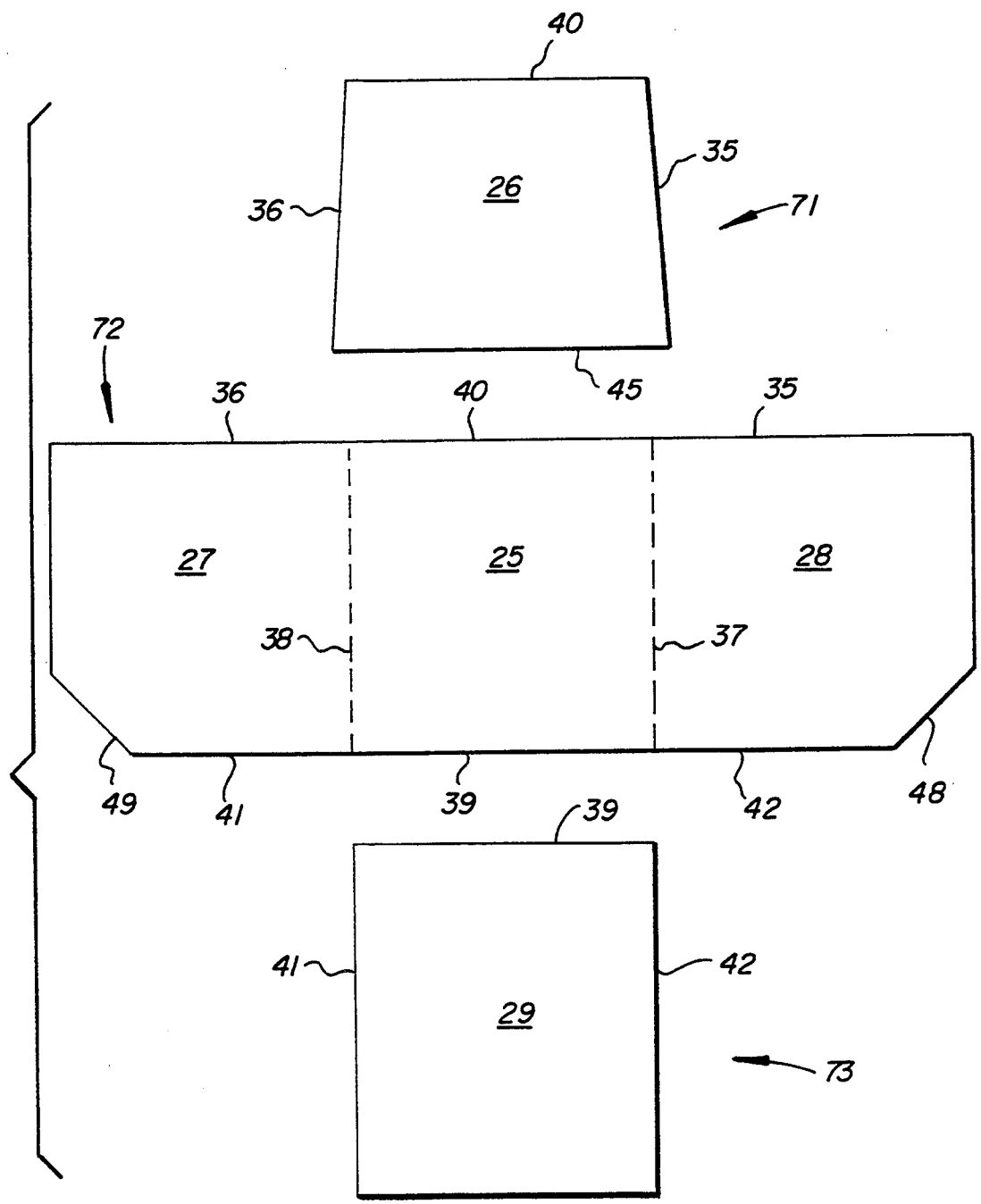
FIG. 5 shows the individual panels used in the preferred assembly of the golf cart cover.

The materials utilized for the cover 12 are relatively thin and lightweight. The cover may, for example, primarily comprise an opaque material, but include a transparent material for the front panel 26. However, it is preferable to use a single transparent lightweight material such as a clear vinyl. Lightweight vinyls are commercially available from companies such as Global Plastics Co. in New York and Environmental Products in Illinois. "Transparent" materials are not limited to those which are perfectly clear, but include any materials which allow visibility from the inside of the cart to the outside. Because vinyl materials are typically purchased on a roll, assembly of the cover 12 is easiest and most cost effective when the material is cut into three sections 71, 72, 73 as shown in FIG. 5, although other methods of assembly are within the scope of the invention. The first section 71 comprises the front panel 26, the second section 72 comprises the roof panel 25 and the opposed side panels 27, 28, and the third section 73 comprises the back panel 29. Generally, the width of a roll of vinyl material is about 54 inches. Thus, in a preferred embodiment, sections 71, 72 and 73 are formed, respectively, by cutting a 54- by 44-inch strip of the material and removing 5- by 44-inch triangular sections from the side edges so that the top edge 40 is 44 inches and the bottom edge 45 is 54 inches, cutting a 54- by 168-inch strip of the material and removing 14- by 14-inch triangular sections from the corners 48, 49, and cutting a 60- by 54-inch strip of the material. The use of a lightweight material allows the sections 71, 72, 73 to be permanently joined by adhesives or heat sealing, thus eliminating the need for stitching or other material intrusive means. In a preferred embodiment, the sections are joined by a double-sided, plasticizer-resistant, industrial grade, adhesive tape which is commercially available from 3M Company.

Generally, the material used for the cover 12 should also be sufficiently flexible to enable the cover 12 to be folded to a compact size and shape such that it can be stored in a golf bag when not in use. Vinyl materials are particularly advantageous because they are less likely to develop mold than are the canvas and tarpaulin materials which are typically utilized for golf cart covers. Thus, in a preferred embodiment of the invention, the cover is made from a 2 to 12 mil vinyl, weighing not more than 8 pounds. Even more preferably, the cover is made of a 6 mil vinyl, having a total weight of no more than 4 pounds, which can be folded to dimensions of 10×12×2.5 inches.

As shown in FIG. 5, section 71 is preferably cut in the shape of a polygon having a bottom edge 45 of greater width than the top edge 40 and side edges 35, 36 of equal length. This type of cut allows the front panel 26 to more readily conform to the angular shape of the front window of a golf cart as seen from the side view of the cover 12 shown in FIG. 3. Referring to section 72, corners 49, 48 at the back lower edge of the side panels 27, 28, respectively, are also preferably cut at an angle to prevent the cover 12 from becoming entangled with the rear wheels. Section 73, forming back panel 29, is essentially rectangular.

Figure 4:
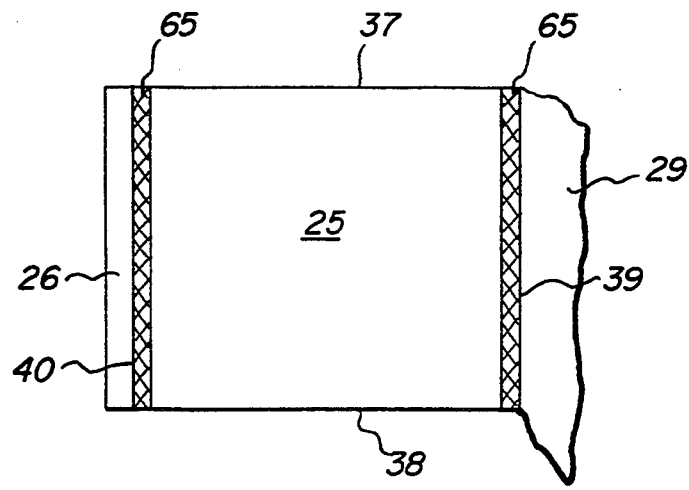
FIG. 4 is a top plan view of the assembled golf cart cover, with the cart omitted.

Meeting edges 35 and 36 of the front panel 26 and side panels 27 and 28 and meeting edges 41 and 42 of the back panel 29 and side panels 27 and 28 are attached by using a double-sided adhesive tape 65. Similarly, FIG. 4 shows a top view of the golf cart cover 12 in which the meeting edges 39, 40 of the front and back panels 26, 29, respectively, with the roof panel 25 are attached using the double-sided adhesive tape 65.

Figure 6:
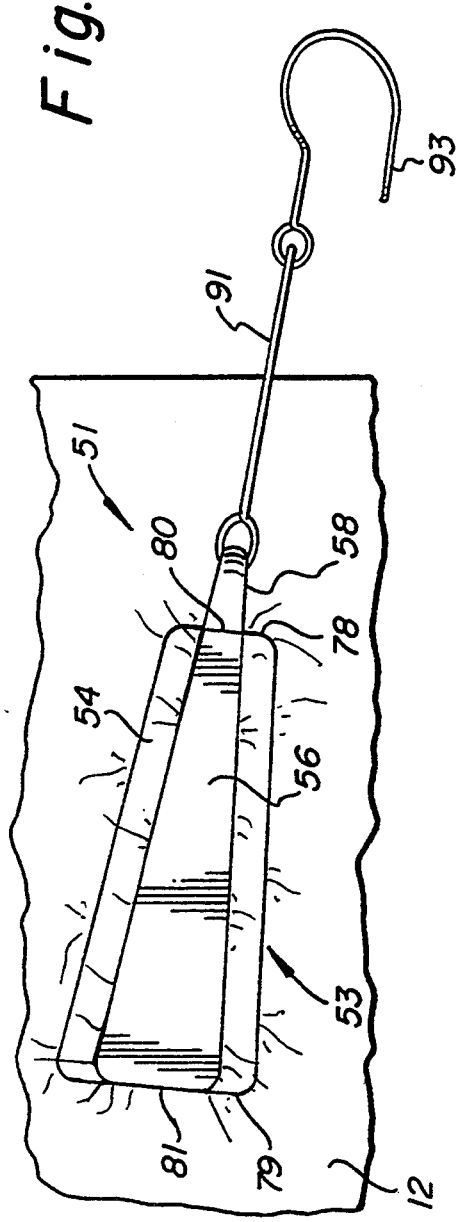
FIG. 6 is a top view of an attachment means for attaching the golf cart cover to the golf cart.

Once the cover 12 is mounted on the cart 11, the side panels 27, 28 may be attached to the base 9 using any appropriate attachment means 51a such as clips and hooks. FIG. 6 shows a top view of a preferred attachment means 51 comprised of a slide clip 53 and a hook 93 connected by a strip of material 91. Typically, the moveable clips 53 are first attached to the cover 12 after it is mounted onto the cart 11, followed by attachment of the hooks 93 at appropriate locations. In a preferred embodiment of the invention, the back panel 29 is held in place by attaching a moveable clip 53 to the upper portion of the back panel 29 and the hook 93 to a suitable structure in the golf club compartment 19. The connecting strip of material 91 should be a flexible material and extend down inside of back panel 29. A Bungee cord is desirable because it is sufficiently flexible to enable attachment of the hook 93, yet remains relatively taut when there is a wind gust, thereby preventing the back panel 29 from flying upward. It is preferable to utilize surgical tubing for attachment of the side panels to the fender wells 18, 64; however, surgical tubing tends to be more flexible than a Bungee cord, thereby allowing the side panels to be lifted for access into and out of the cabin 20 without the need to detach the hooks 93 from the front fender wells 18. Where the golf cart 11 is equipped with handles 17 adjacent the seats 22 as shown in FIG. 3, it is desirable to use hook and loop fasteners, such as Velcro ®, for the strip of material 91 which may be looped around the handles 17, thereby eliminating the need for a hook. Similarly, attachment means 51d may comprise moveable clips 53 attached to the front panel 26 with hook and loop fasteners attached to the cart 11 by looping the material 91 around supporting posts 13, 14.

Thus, by attaching the cover 12 as described above, the total number of attachment means 51a–d required for attachment to a cart having a windshield is 5 and is for attachment to a cart without a windshield is 7. Moreover the moveable clips 53 may be attached anywhere on the cover 12 to correspond to the most desireable positions for attachment on the cart 11.

Figure 7:
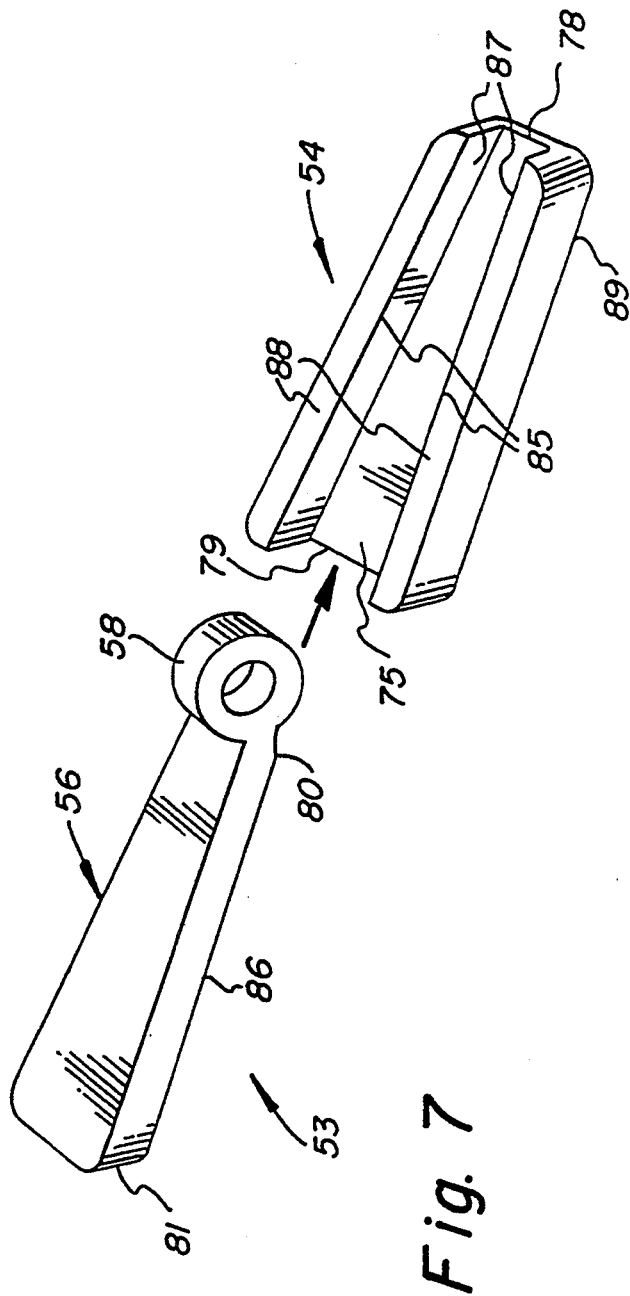
FIG. 7 is a perspective view of a moveable clip used in the attachment means shown in FIG. 6.

FIG. 7 shows a perspective view of the moveable clip 53 of FIG. 6. Moveable clips 53 used in accordance with the present invention are commercially available from the Griffolyn Company, Inc. The moveable clips 53 are comprised of top and bottom pieces 56, 54, respectively. The bottom piece 54 has a recess 75 extending across its length and open at both ends 78, 79. End 78 is narrower in width than end 79. The top piece 56 conforms to the shape of the recess 75, and is, therefore, narrower at end 80 than at end 81 to prevent piece 56 from sliding out of end 78 when pressure is applied via the strip of material 91 attached to eyelet 58 during attachment of the cover 12 to the cart 11. The sides 87 of the recess 75 are also angled slightly outward from the top 88 to the base 89 to hold the top piece 56 securely in the bottom piece 54. The clip 53 is attached to the cover 12 by placing the cover 12 between pieces 54 and 56 and sliding piece 56 into piece 54 in the direction indicated by the arrow, such that ends 80 and 78 and ends 75 and 81 are substantially contiguous. Edges 85 and 86 of pieces 54 and 56, respectively, are rounded to prevent the cover 12 from being torn. The moveable clips 53 are advantageous because their design allows them to be used on thick or thin materials. Thus, because a relatively thin material is contemplated for manufacture of the cover 12, it is possible to fold up the side panels 27, 28, and attach the clips 53 onto several folded layers of material. In this manner, it is possible to hold up the side panels 27, 28, for example on a hot day, to allow air to circulate through the cabin 20.

Other advantages of the present invention are that the cover, when made of a single transparent vinyl material, provides excellent visibility from all sides. Vinyl materials are generally very flexible and will retain their shape even after stretching, thereby allowing the cover to be stretched tightly around the cart to provide a weatherproof seal. Because the cover completely encloses the cart except for slits between the back and side panels, it can be used to keep heat inside the cabin on a cold day. Both material and manufacturing costs are relatively low compared to conventional golf cart covers.

Although the invention has been described in considerable detail with respect to preferred embodiments thereof, variations and modifications will be apparent to those skilled in the art without departing from the spirit and scope of the invention as set forth in the claims.

We claim:

1. A cover for a golf cart of the type having a roof over a cabin section of the cart, wherein the cover rests on the roof, comprising:
   a roof panel,
   opposed side panels connected to the roof panel,
   a front panel connected to the roof panel, and
   a rear panel connected to the roof panel,
   the panels, to the extent that they are not formed as one piece with adjacent panels, being connected together by a plasticizer resistant adhesive in the form of a double-sided adhesive tape, such that the entire cover, including the joints, can be readily folded into a compact size and shape for compact storage.

2. A cover for a golf cart according to claim 1, wherein the material of the cover is transparent.

3. A cover for a golf cart according to claim 1, wherein the weight of the cover is no more than four pounds.

4. A cover for a golf cart according to claim 1, wherein the material of the cover is a 2 to 12 mil vinyl.

5. A cover for a golf cart according to claim 4, wherein the material of the cover is approximately 6 mil vinyl.

6. A cover for a golf cart according to claim 1, wherein the cover may be folded to dimensions of approximately $10 \times 12 \times 2.5$ inches.

7. A cover for a golf cart according to claim 1, wherein the roof panel and the opposed side panels are formed from a single piece of material.

8. A cover for a golf cart according to claim 7, wherein a top edge of the front panel is joined to a front edge of the roof panel, side edges of the front panel are joined to the opposed side panels and a top edge of the rear panel is joined to a back edge of the roof panel.

9. A cover for a golf cart according to claim 1, wherein access to the interior of the golf cart is provided solely by separation between each of the side panels and the rear panel at their respective meeting edges.

10. A cover for a golf cart according to claim 9, including means for attaching the cover to the a golf cart by attachment means attached to the cover and engageable with an edge of the golf cart.

11. A cover for a golf cart according to claim 1, wherein the rear panel is of sufficient size to cover a golf club compartment of the golf cart.

12. A cover for a golf cart according to claim 11, including an attachment means extending from the rear panel and engageable with a portion of the golf club compartment.

13. A cover for a golf cart of the type having a roof over a cabin section of the cart, wherein the cover rests on the roof, comprising:
a roof panel,
opposed side panels connected to the roof panel,
a front panel connected to the roof panel,
a rear panel connected to the roof panel, and
means for removably attaching each side panel to a handle on the side of the golf cart,
the side panels meeting the rear panel essentially at the corner of the cart where the sides meet the rear of the cart, the side panels being separated from the rear panel at said corner, such that (1) the side panels are liftable up along the side of the cart to provide access to the interior of the cart, and (2) the rear panel is liftable to cover a golf club compartment.

14. A cover for a golf cart according to claim 13, wherein the material of the cover is transparent.

15. A cover for a golf cart according to claim 13, wherein each side panel is attachable to a front fender well of a golf cart by an attachment means, each attachment means being attachable at one end to its respective side panel and attachable at its other end to the fender well of the golf cart.

16. A cover for a golf cart according to claim 15, wherein surgical tubing connects the two ends of the attachment means.

17. A cover for a golf cart according to claim 15, wherein the end of each attachment means attachable to the side panel includes a first part having a recess therein and a second part conforming to the shape of the recess and capable of being received and securely retained therein, and removable therefrom, while engaging the material of the side panel between the first and second parts, and the opposite end of the attachment means, constituting a hook engageable with the fender well of the golf cart.

18. A cover for a golf cart according to claim 13, including an attachment means for attaching the rear panel to the golf club compartment of the golf cart.

19. A cover for a golf cart according to claim 18, wherein the attachment means for attaching the rear panel to the golf club compartment comprises a first end having two parts which engage opposite sides of the rear panel to secure a portion of the rear panel thereto and a second end connectable to the golf club compartment, the two ends being connected together by a Bungee cord.

20. A cover for a golf cart according to claim 13, wherein the panels, to the extent that they are not joined to other panels as one piece, are connected together by double-sided adhesive tape.

21. A cover for a golf cart according to claim 20, wherein the material of the cover is approximately 6 mil vinyl.

22. A cover for a golf cart according to claim 21, wherein the cover may be folded into a compact shape of approximately $10 \times 12 \times 2.5$ inches.

23. A cover for a golf cart of the type having a roof over a cabin section of the cart, wherein the cover rests on the roof, comprising:
a roof panel,
opposed side panels connected to the roof panel,
a front panel connected to the roof panel, and
a rear panel connected to the roof panel,
the side panels being separated from the rear panel at the corner whereat they meet, access to the interior of the cart being solely at the separation between the side panels and rear panel, and
attachment means having two ends for attaching the side panels to a part of the cart, the first end of each attachment means being movable to be positionable at different locations on its respective side panel, and the second end including means for attachment to different edge locations on the cart.

24. A cover for a golf cart according to claim 23, wherein said attachment means includes, for each side panel, an attachment device comprising two ends and a flexible material extending therebetween, a first of said ends comprising a first part having a recess therein and a second part conforming to the shape of the recess, these two parts engaging a portion of the side panel securely retained therebetween, and the second end being engageable with an edge of a fender well of the golf cart.

25. A cover for a golf cart according to claim 24, wherein the flexible material is surgical tubing.

26. A cover for a golf cart according to claim 23, including means for removably attaching the side panels to handles on the side of the golf cart.

27. A cover for a golf cart of the type having a roof over a cabin section of the cart, wherein the cover rests on the roof, comprising:

a roof panel, opposed side panels, a front panel, and a back panel, all panels being formed from a lightweight material, and wherein those panels which are not formed as one piece with adjacent panels are joined to adjacent panels by using a double-sided adhesive tape.

28. A cover for a golf cart according to claim 27, wherein the material of the cover is transparent.

29. A cover for a golf cart of the type having a roof over a cabin section of the cart, wherein the cover rests on the roof, comprising:

a roof panel, opposed side panels connected to the roof panel, a front panel connected to the roof panel, and a rear panel connected to the roof panel, wherein the panels, to the extent that they are not joined to other panels as one piece, are connected together by double-sided adhesive tape, the side panels meeting the rear panel essentially at the corner of the cart where the sides meet the rear of the cart, the side panels being separated from the rear panel at said corner, such that (1) the side panels are liftable up along the side of the cart to provide access to the interior of the cart, and (2) the rear panel is liftable to cover a golf club compartment.

30. A cover for a golf cart according to claim 29, wherein the material of the cover is approximately 6 mil vinyl.

31. A cover for a golf cart according to claim 30, wherein the cover may be folded into a compact shape of approximately 10×12×2.5 inches.

* * * * *